United States Patent [19]

Flugger

[11] Patent Number: 5,123,502
[45] Date of Patent: Jun. 23, 1992

[54] MUFFLER ASSEMBLY WITH PERFORATED PARTITION FOR IGNITION OF ACCUMULATED FUEL AND METHOD

[75] Inventor: Ray T. Flugger, Santa Rosa, Calif.

[73] Assignee: Flowmaster, Inc., Santa Rosa, Calif.

[21] Appl. No.: 575,415

[22] Filed: Aug. 30, 1990

[51] Int. Cl.$^5$ .............................. F01N 1/08
[52] U.S. Cl. .................. 181/264; 181/269; 181/272
[58] Field of Search ............ 181/264, 265, 266, 269, 181/270, 272; 422/176; 60/297, 288

[56] References Cited

U.S. PATENT DOCUMENTS

| | | | |
|---|---|---|---|
| 624,062 | 5/1899 | Mattews et al. | 181/264 |
| 1,081,348 | 12/1913 | Unke | 181/264 |
| 1,184,431 | 5/1916 | Dodge | 181/264 |
| 2,071,351 | 2/1937 | McNamara | 181/272 |
| 2,239,549 | 4/1941 | Chipley | 181/269 |
| 2,325,905 | 8/1943 | Caulfield | 181/268 |
| 2,485,555 | 10/1949 | Bester | 181/260 |
| 2,667,940 | 2/1954 | Gallihugh | 181/265 |
| 2,971,599 | 2/1961 | Tobias | 181/265 |
| 3,503,714 | 3/1970 | Lang | 60/288 |
| 4,574,914 | 3/1986 | Flugger | 181/268 |
| 4,809,812 | 3/1989 | Flugger | 181/268 |

FOREIGN PATENT DOCUMENTS 285604 2/1928 United Kingdom .

*Primary Examiner*—Russell E. Adams
*Assistant Examiner*—Jae N. Noh
*Attorney, Agent, or Firm*—Flehr, Hohbach, Test, Albritton & Herbert

[57] ABSTRACT

A compact, sound-attenuating muffler for an internal combustion engine or the like. The muffler has a divergently tapered partition located near the inlet of the muffler for dividing the exhaust gases into two pulse streams with similar sound frequencies to achieve sound attenuation when the streams are converged back together. The diverging partition creates a low-pressure volume or region on the partition's downstream side where unignited fuels may accumulate. The partition is formed with a passageway to provide communication of live fire from the inlet of the muffler to the low-pressure volume for ignition of any unignited fuel. A method of communication of live fire from the inlet of the muffler to the low-pressure volume on the downstream side of the diverging partition in the muffler also is described.

10 Claims, 1 Drawing Sheet

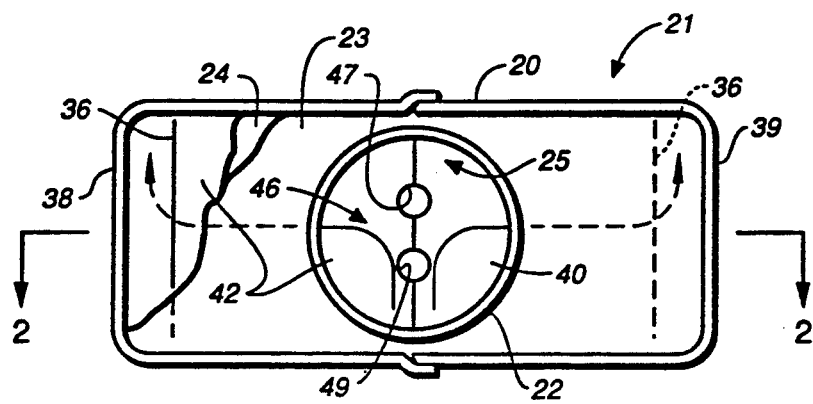
FIG._1
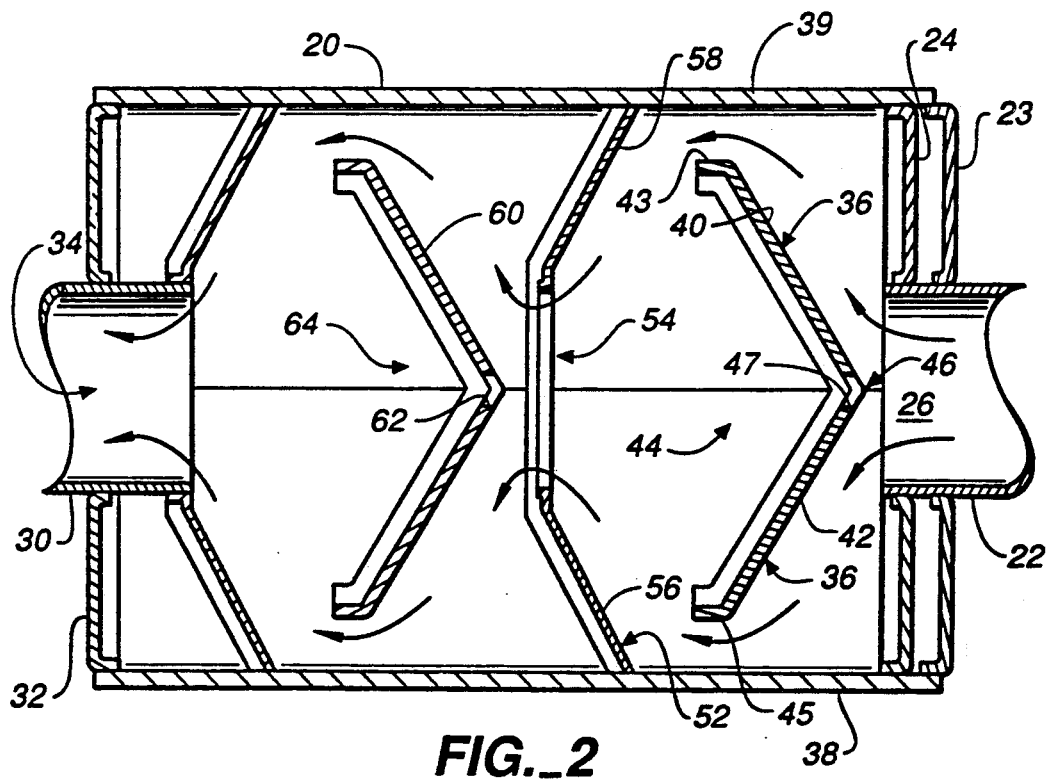
FIG._2

MUFFLER ASSEMBLY WITH PERFORATED PARTITION FOR IGNITION OF ACCUMULATED FUEL AND METHOD

TECHNICAL FIELD

In general, the present invention relates to sound-attenuating mufflers for internal combustion engines and, more particularly, this invention relates to mufflers including partitions which effect sound attenuation, in part, by employing low-pressure volumes on the downstream sides of the sound-attenuating partitions.

BACKGROUND ART

Mufflers have been developed for the attenuation of the sound component in an exhaust gases from an internal combustion engine which employ sound-attenuating partition configurations that produce low-pressure regions or volumes within the muffler. The low-pressure volume can be the result of cancellation of identical sound frequencies by directing streams of gas to collide against each other, or can be the result of fluid flow patterns through the muffler, or both.

The flow of exhaust gases through a muffler is not in a steady stream of the type which exits a garden hose. Instead, each time an exhaust valve opens, a pulse of exhaust gases is discharged into the exhaust system. Thus, flow of exhaust gases through a muffler is comprised of a series of volume pulses in which there are fully combusted gases, live fire or burning fuel and, in some cases, fuel which is unignited and will not contact or mix sufficiently with the burning fuel to ignite.

When these exhaust components reach the muffler, the muffler partitions typically quench or retard further burning of unignited fuel rather quickly. The result is that a small volume of unignited fuel may be present in the muffler. If the muffler includes low-pressure regions or volumes, there will be a tendency for this unignited fuel to accumulate in such regions.

The presence of a low-pressure volume in a muffler, nevertheless, is highly desirable since in some muffler configurations it has been found to increase engine horsepower. It is believed that the low-pressure region in the muffler is "seen" upstream in the exhaust system to the engine. The low pressure in the muffler scavenges or accelerates the movement of exhaust gas pulses in the exhaust system. Thus, pulses proximate the low-pressure volume are accelerated toward it, which, in turn, accelerates pulses farther upstream. Finally, when the engine exhaust valve opens to exhaust gases from the cylinder, these gases are exhausted into a lower pressure exhaust system than would be present if the muffler did not have low-pressure volumes in it. This slightly lower pressure at the exhaust valve enables the same volume of gases to be exhausted from the cylinder in a slightly shorter period of time. This, in turn, allows the engine to be tuned to keep the exhaust valve closed slightly longer, which allows the engine to develop additional horsepower.

A muffler which employs these principles and has been highly effective in sound attenuation while increasing engine horsepower is the muffler of my U.S. Pat. No. 4,574,914. This muffler is now in wide-spread use by independent professional race car drivers and even by some of the manufacturer-sponsored racing teams.

While not as effective in their sound-attenuation/-horsepower-increase as the muffler of U.S. Pat. No. 4,574,914, other mufflers which include partition structures that will tend to produce, in varying degrees, low-pressure volumes or regions within the mufflers include: U.S. Pat. Nos. 624,062; 1,184,431; 1,081,348; 2,071,351; 2,325,905; 2,239,549; 2,485,555; 2,667,940; 2,971,599 and British Patent No. 285,604.

The accumulation of unignited fuels in mufflers having low-pressure volumes can present a problem which ranges from annoying to potentially dangerous. Under most operating conditions such fuels are either not accumulated or are dissipated. However, under some conditions explosive detonations or rapid combustion can occur. Thus, when engines are tuned to run on a rich fuel mix, or when turbo-chargers are employed and the engine is decelerating, unignited fuel is more likely to accumulate and be ignited or explode in low-pressure regions of mufflers. Either live fire or accumulated muffler heat appears to ignite the accumulated fuel. Such muffler explosions can range from disconcerting popping sounds during deceleration to violent explosions which damage the muffler and exhaust system.

In turbo-charged production cars using the muffler of my U.S. Pat. No. 4,574,914, for example, muffler popping has been observed during engine deceleration.

In high-performance racing cars which burn alcohol, as well as gasoline, mufflers constructed in accordance with U.S. Pat. No. 4,574,914 have occasionally experienced sufficiently violent explosions or fuel detonations to burst the muffler casing. While occurring only under the just the right combination of conditions, such muffler explosions are, of course, highly undesirable.

OBJECTS OF THE INVENTION

Accordingly, it is an object of the present invention to provide a sound-attenuating muffler for an internal combustion engine or the like, and method, which prevents the accumulation of unignited fuel in low-pressure volumes in the muffler without significantly decreasing the sound-attenuating capacity of the muffler.

It is another object of the present invention to provide a sound-attenuating muffler and method which prevents accumulation of unignited fuel in the muffler without decreasing the enhanced engine performance produced by the muffler.

It is a further object of the present invention to provide a sound-attenuating muffler which prevents accumulation of unignited fuels in the muffler, yet is still compact and durable, has a minimum number of components and is economical to manufacture.

These and related objects may be achieved through the use of the muffler herein disclosed, which will prevent the accumulation of unignited gases by introducing live fire to the low-pressure volume behind the partition in order to prevent violent burning of any unignited fuels.

The muffler of the present invention has other objects and features of advantage which will become apparent from, and are set forth in more detail in, the description of the Best Mode of Carrying Out the Invention and the accompanying drawing.

DISCLOSURE OF THE INVENTION

The compact, sound-attenuating muffler of the present invention includes a partition assembly proximate the inlet opening for deflecting the exhaust gases in a manner developing a volume or region of low-pressure on the downstream side of the partition where unignited fuel can accumulate. The improvement in the muffler assembly of the present invention comprises, briefly, the partition being formed to provide a passageway allowing live fire from the engine to pass from the inlet opening of the muffler through the partition to the downstream side of the partition to the region where unignited fuel may accumulate. The fire thus passed to the low-pressure volume in the muffler will ignite and burn any unignited fuel which may have begun to accumulate there.

In another aspect of the invention a method for preventing the build-up of unignited fuel in a muffler is provided which includes the step of communicating live exhaust fire from an upstream side of a sound-attenuating partition to a downstream, low-pressure side of the partition to ignite accumulated fuel.

DESCRIPTION OF THE DRAWING

FIG. 1 is a front elevation view of a muffler constructed in accordance with the present invention.

FIG. 2 is a top plan view, in cross-section, taken substantially along the plane of line 2—2 in FIG. 1.

BEST MODE OF CARRYING OUT THE INVENTION

A muffler, generally designated 21, for an internal combustion engine can be seen in the drawing to include a casing 20, an inlet pipe 22 extending through casing end wall members 23 and 24 for the flow of exhaust gases through inlet opening 26 into casing 20. The muffler further includes an outlet pipe 30 mounted to extend through casing end wall 32 and providing an outlet opening 34 for the discharge of gases from the casing. Mounted in casing 20 is a diverging partition, generally designated 36, which is cup-shaped and deflects exhaust gases toward side walls 38 and 39 of casing 20. Partition 36 effects a division of the incoming exhaust gas pulses into two pulse streams as the gases pass through inlet opening 26 and impinge upon the partition.

As best may be seen in FIG. 2, diverging partition 36 includes a pair of divergently tapering planar surfaces 40 and 42 oriented in substantially vertical planes and connected at an apex positioned at substantially the center of the pulse stream of exhaust gases discharged into the muffler through inlet pipe 22. The exhaust gases are divided by partition 36 into two pulse streams, and the pulse streams are brought back together downstream of partition 36 by converging partition 52 so that the colliding or intersecting of pulse streams, with identical sound frequencies, will result in sound cancellation or attenuation, or at least partial sound cancellation or attenuation.

The cancellation of sound frequencies on the downstream side of partition 36 is believed to tend to lower pressure inside the muffler behind partition 36. Moreover, as the exhaust gases pass between ends 43 and 45 of partition 36 and side walls 38 and 39 of casing 20 and expand into volume 44 behind partition 36, a further lowering of pressure in the muffler is created on the downstream side of diverging partition 36. Thus, a low-pressure volume or region 44 exists in muffler 21, which partially may be the result of sound cancellation during intersecting pulse streams and partially is the result of fluid flow, and particularly expansion, behind partition 36.

While low-pressure volume 44 is highly effective in sound cancellation and results in inducing increased engine horsepower, one disadvantage of low-pressure volume 44 is that there is a tendency for unignited fuel to migrate to or accumulate in region or muffler volume 44. Thus, the build-up of unignited fuels in muffler 21 behind partition 36 presents a substantial hazard, since the high temperature of the unignited exhaust gases, combined with the high temperature of the internal surfaces of the muffler, can cause the unignited fuels to spontaneously combust, or even detonate. In less severe cases this spontaneous ignition of fuel in the muffler will create popping or back firing sounds, usually only on engine deceleration. In more severe cases, the muffler casing can even be burst or ruptured by the exploding fuel.

While the problem of unburned fuel build-up in a muffler has been described in connection with a muffler constructed as shown in FIGS. 1 and 2 (which, as thus far described, is identical to the muffler of my U.S. Pat. No. 4,574,914), it will be understood that many other muffler partition configurations, which have low-pressure regions or volumes, are susceptible to unburned fuel build-up problems. The muffler of the present invention, therefore, is designed to prevent such build-up without significantly reducing the highly efficient sound attenuation and without reducing the low pressure scavenging effect which increases engine horsepower.

In order to prevent unignited fuel build-up on the downstream side of diverging partition 36, the partition is provided with passageway means, generally designated 46, which communicates live exhaust fire to low-pressure volume 44 in which unburned fuel can accumulate.

Passageway means 46 may advantageously be provided by at least one aperture 47 and preferably by a plurality of apertures 47 and 49. The passageway must be formed of a size which is sufficiently large and at a location which will communicate live fire through partition 36 in a volume sufficient to ignite any unignited fuel in volume 44. Passageway 46, however, should not be so large as to defeat, or significantly reduce, the sound attenuating effects achieved by using a diverging partition to divide the exhaust gases into two pulse streams. Thus, the partition apertures should not provide a straight-through path for the flow of a significant volume of exhaust gases directly from inlet 26 to opening 54 in converging partition 52. Such a straight-through gas flow path would defeat the sound attenuation achieved by intersecting exhaust streams having the same frequency sound components, and would probably effectively eliminate the low-pressure region in the muffler.

In the preferred form of the muffler of the present invention, it has been found that two apertures, each having a diameter of about one-quarter inch, provide an area large enough to pass sufficient live fire through partition 36 to ignite unignited gases in volume 44 without measurably reducing the sound attenuation or reducing the horsepower increase. Two apertures 47 and 49 are preferred to a single aperture of the same area since they provide two possible paths for the communication of live fire to volume 44. The swirling pulsing nature of the exhaust gases and fire entering the muffler makes precise prediction of the best location for a single aperture somewhat uncertain.

In a 350 horsepower, gasoline-burning engine, however, with an exhaust inlet pipe 22 having a diameter of about 3.0 inches, a partition 36 having a single hole with a diameter of five-eighths inch at the center of the height of the partition apex completely prevented muffler exhaust explosions. Moreover, sound attenuation and engine horsepower were not decreased by a measurable amount.

On the high end, it is estimated that the diameter of passageway 46 need not be larger than about three-quarter inch. A larger passageway or aperture, for example, of a size to dissipate fuel build-up in volume 44 by fluid flow rather than ignition, would start to degrade the low-pressure effects of the muffler undesirably. The preferred range of diameters for a single aperture sufficient to achieve ignition when gasoline is used as the fuel, therefore, is believed to be about one-quarter inch to about three-quarters inch. For alcohol, which is harder to ignite, the single hole diameter should be slightly larger at the small end of the range, e.g., about three-eighths inch to about three-quarters inch.

It will be understood that, as used herein, the expression "diameter" of passageway 46 or apertures 47 and 49 shall mean a characteristic transverse dimension.

Apertures 47 and 49 preferably are round since they may be easily formed by drilling, but the passageway can be provided by rectangles, hexagons, octagons or irregular shapes without departing from the principles of the present invention.

The muffler as illustrated in FIG. 2 also includes a converging partition 52 with a central opening 54 through which exhaust gases must pass. It is the converging partition and central opening which causes the divided stream pulses to collide and effect sound attenuation. In racing versions of the muffler, outlet pipe 30 is mounted in opening 54 and the muffler has a single diverging-converging set of partitions. The muffler of FIG. 2 includes two diverging-converging partition sets and is employed when further sound attenuation is desired, for example, for production mufflers.

In mufflers such as is illustrated in FIG. 2 having a second diverging partition, the build-up of unignited fuel behind second diverging partition 60 is not very likely to occur, particularly if the unignited fuel in volume 44 is ignited. Also, unignited fuel will not ignite as easily behind partition 60 since any unignited fuel reaching low-pressure volume 64 will have a lower temperature than the fuel in volume 44, as will the muffler components further downstream. However, muffler 21 of the present invention can include a passageway or aperture 62 in second partition 60 to communicate live fire through partition 60. Since ignition of exhaust gases in volume 44 is produced by aperture 46, the live fire from such ignition can be used to trigger ignition of any unignited fuel in volume 64 behind partition 60. Aperture 62, therefore, should be approximately the same size as passageway 46, or slightly larger.

While the preferred form of the muffler of the present invention is shown in the drawing, the provision of a passageway for live fire across a partition which is configured in a manner which can cause a build-up of fuel on a back or downstream side thereof is applicable to other muffler structures. For example, in the muffler of U.S. Pat. No. 2,485,555 having conical partitions, an aperture at or about the apex of each cone would effect ignition of accumulated unignited fuel before dangerous build-up occurs.

The method of the present invention, therefore, is comprised of the step of communicating live fire to a low-pressure volume in a muffler for ignition of any unignited fuel which may accumulate there. This method can be accomplished by formation of the muffler partitions with passageways during manufacture of the same, or even after manufacture of the muffler, as a corrective measure, by drilling an opening in the diverging partition through the inlet opening.

What is claimed is:

1. A compact, sound attenuating muffler for an internal combustion engine or the like comprising:

a casing having an inlet opening formed for the flow of exhaust gases into said casing, and an outlet opening formed for the discharge of gases from said casing;

sound-attenuating partition means having divergently tapered surfaces in a downstream direction and supported from said casing, said exhaust gases impinging onto a upstream side of said partition means, said partition means being formed for the passage of gases therearound and said partition means defining an empty volume on a downstream side thereof into which exhaust gases passing around said partition means, including unignited fuel, enter; and said partition means further having a passageway means extending therethrough and positioned intermediate opposed ends of said surfaces and having a size sufficiently large to communicate live exhaust fire from an upstream side of said partition means to said empty volume downstream of said partition means for ignition of accumulated unignited fuel and sufficiently small to prevent significant flow of exhaust gases therethrough.

2. A compact, sound attenuating muffler as defined in claim 1 wherein, said partition means has an apex portion positioned in opposed relation to said inlet opening to divide said exhaust gases into two separate and distinct streams, and said passageway means is positioned proximate said apex portion.

3. A compact sound-attenuating muffler as defined in claim 2 wherein, said casing is formed with a transverse cross-section having a width dimension and a height dimension, said partition mans is formed to extend over the full height dimension of said casing to deflect said streams toward opposite side walls of said casing.

4. A compact, sound-attenuating muffler as defined in claim 2 wherein, said partition means has a thin wall and a cup-like transverse cross section defining said empty volume, and said passageway means is an aperture through said thin wall to said empty volume.

5. A compact, sound-attenuating muffler as defined in claim 4, and a partition means having convergently tapering surfaces in a downstream direction supported in said casing and located downstream of said partition means having said divergently tapering surfaces.

6. A compact, sound-attenuating muffler as defined in claim 1 wherein, said passageway means is provided by an aperture having a diameter in the range of about one-quarter inch to about three-quarter inch.

7. A compact, sound-attenuating muffler as defined in claim 1 wherein, said passageway means has a size determined by the type of unignited fuel which can accumulate in said empty volume and said size is larger for harder to ignite fuel.

8. A compact, sound-attenuating muffler as defined in claim 1 wherein, said partition means is a cup-like and thin-walled partition having an open side of the cup facing downstream.

9. A compact, sound-attenuating partition as defined in claim 1 wherein, said passageway means is provided by a plurality of spaced apart apertures positioned to insure communication of live exhaust fire to said volume through at least one aperture to said empty volume.

10. The compact, sound-attenuating muffler as defined in claim 1 wherein, said muffler includes a second sound-attenuating partition means supported in said casing downstream of the first-named partition means, said second sound-attenuating partition means having surfaces divergently tapering in a downstream direction and defining a second substantially empty volume on a downstream side thereof, and passageway means in said second partition means extending from an upstream side of said second partition means to said second empty volume, said passageway means in said second partition means being positioned and having a size communicating live exhaust fire to said second empty volume from an upstream side of said second partition means for ignition of accumulated unignited fuel in said second empty volume.

* * * * *